US008955407B2

(12) United States Patent
Sakuma

(10) Patent No.: US 8,955,407 B2
(45) Date of Patent: Feb. 17, 2015

(54) STEERING APPARATUS

(75) Inventor: Yuuichi Sakuma, Gunma-ken (JP)

(73) Assignee: NSK Ltd., Tokyo (JP)

( * ) Notice: Subject to any disclaimer, the term of this patent is extended or adjusted under 35 U.S.C. 154(b) by 302 days.

(21) Appl. No.: 13/521,043

(22) PCT Filed: May 30, 2012

(86) PCT No.: PCT/JP2012/063857
§ 371 (c)(1),
(2), (4) Date: Jul. 7, 2012

(87) PCT Pub. No.: WO2012/165454
PCT Pub. Date: Dec. 6, 2012

(65) Prior Publication Data
US 2012/0325041 A1 Dec. 27, 2012

(30) Foreign Application Priority Data
May 30, 2011 (JP) .................................. 2011-119868

(51) Int. Cl.
*B62D 1/184* (2006.01)
*B62D 1/16* (2006.01)
*B62D 1/185* (2006.01)
(52) U.S. Cl.
CPC . *B62D 1/16* (2013.01); *B62D 1/185* (2013.01)
USPC ........................................... 74/493; 280/777
(58) Field of Classification Search
CPC .................................. B62D 1/185; B62D 1/16
USPC .............................. 74/492, 493; 280/775, 777
See application file for complete search history.

(56) References Cited

U.S. PATENT DOCUMENTS

| 5,520,416 A * | 5/1996 | Singer et al. .................. 280/775 |
| 5,722,300 A * | 3/1998 | Burkhard et al. ............... 74/493 |
| 6,354,626 B1 * | 3/2002 | Cartwright .................... 280/777 |
| 6,405,612 B1 * | 6/2002 | Kinoshita et al. ............... 74/411 |
| 6,854,765 B2 * | 2/2005 | Heinzman et al. ............ 280/776 |
| 6,948,741 B2 * | 9/2005 | Manwaring et al. .......... 280/775 |
| 7,290,800 B2 * | 11/2007 | Schwarzbich et al. ........ 280/775 |
| 7,338,078 B2 * | 3/2008 | Yamada ....................... 280/775 |

(Continued)

FOREIGN PATENT DOCUMENTS

JP 2006-300260 A 11/2006
JP 2007-230289 A 9/2007

(Continued)

OTHER PUBLICATIONS

English translation of International Preliminary Report on Patentability from International Patent Application No. PCT/JP2012/063857 mailed Dec. 12, 2013.

*Primary Examiner* — David M Fenstermacher
(74) *Attorney, Agent, or Firm* — Miles & Stockbridge P.C.

(57) ABSTRACT

It might happen that an inner column 3 is released from telescopic clamping and tilt clamping by an outer column 4 in a state before a vehicle fitting bracket 2 is fitted to a vehicle body. When a male steering shaft 6 is to escape from a female steering shaft 5, a come-out preventive member 7 is intruded into an inner peripheral annular groove 52 vicinal to an end portion of a female spline 51 on the front side with respect to the vehicle body. Then, the come-out preventive member 7 abuts on a shoulder portion 521 of the end portion, on the front side with respect to the vehicle body, of the inner peripheral annular groove 52, thereby surely enabling the male steering shaft 6 from escaping out of the female steering shaft 5.

16 Claims, 11 Drawing Sheets

(56) References Cited

U.S. PATENT DOCUMENTS

| | | | |
|---|---|---|---|
| 7,481,130 B2 * | 1/2009 | Yamada et al. | 74/493 |
| 7,726,691 B2 * | 6/2010 | Yamada | 280/775 |
| 7,784,830 B2 * | 8/2010 | Ulintz | 280/775 |
| 7,975,569 B2 * | 7/2011 | Klos | 74/493 |
| 8,127,639 B2 * | 3/2012 | Manwaring et al. | 74/492 |
| 8,616,580 B2 * | 12/2013 | Maniwa et al. | 280/779 |
| 8,627,742 B2 * | 1/2014 | Ridgway et al. | 74/493 |
| 8,640,567 B2 * | 2/2014 | Matsuno et al. | 74/493 |

FOREIGN PATENT DOCUMENTS

| | | |
|---|---|---|
| JP | 2010-126038 A | 6/2010 |
| JP | 2010-208588 A | 9/2010 |

* cited by examiner

FIG.6A
FIG.6B
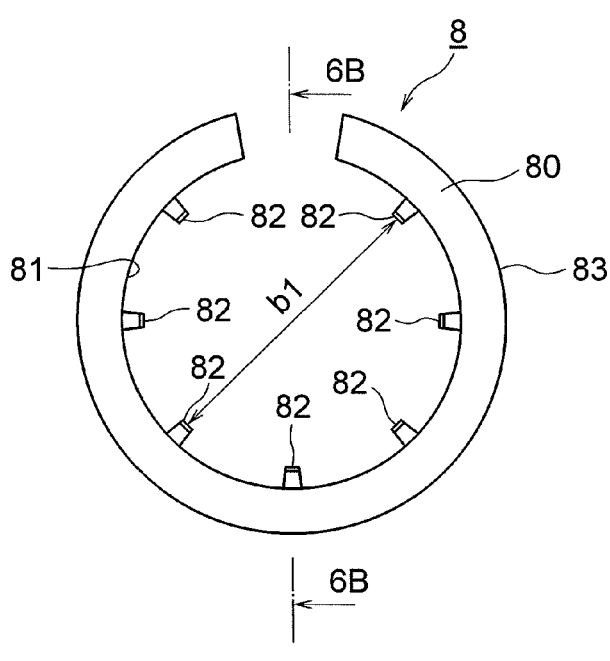
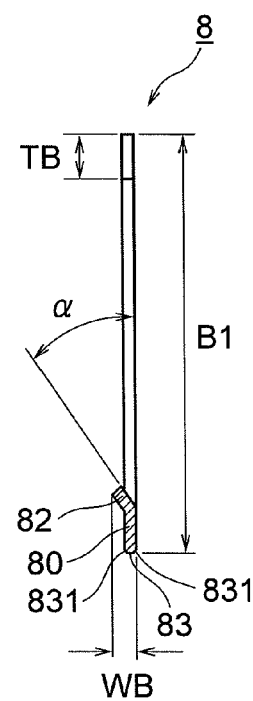

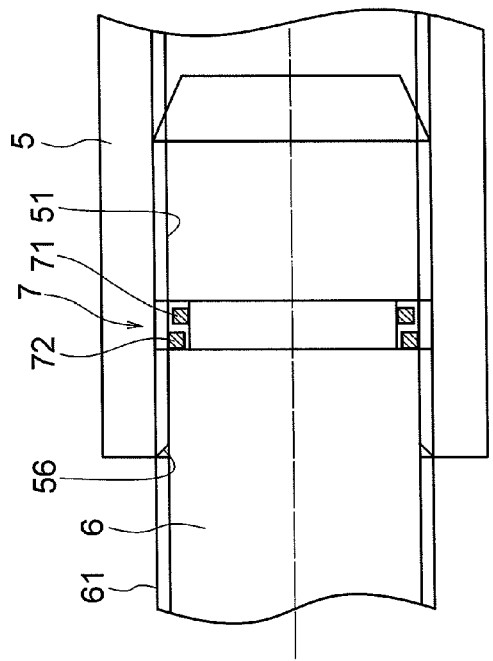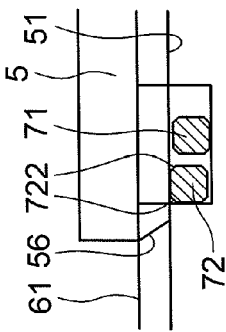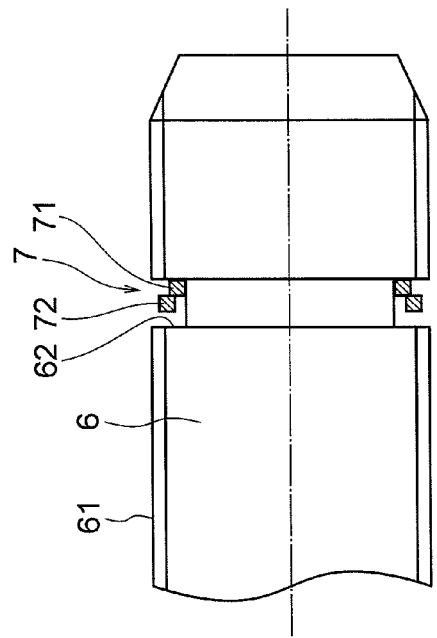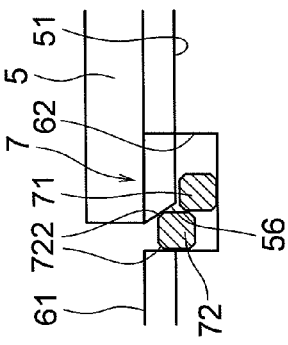

STEERING APPARATUS

TECHNICAL FIELD

The present invention relates generally to a steering apparatus, and more particularly to a steering apparatus configured to adjust a telescopic position of a steering wheel by fitting an outer column and an inner column together slidably in an axial direction.

BACKGROUND ART

There is a telescopic type steering apparatus configured to adjust the telescopic position of the steering wheel by fitting the outer column and the inner column together slidably in the axial direction. Further, as disclosed in Japanese Patent Application Laid-Open No. 2010-208588, there is a tilt/telescopic type steering apparatus configured to adjust both of the telescopic position and a tilt position of the steering wheel.

In this type of steering apparatus, after completing the adjustment of the telescopic position, an inner periphery of the outer column clamps an outer periphery of the inner column by reducing a diameter of an outer column having a slit, thus clamping the inner column so that the outer column is disabled from relatively moving in the axial direction. Further, a lower steering shaft is fitted such as being spline-fitted to an upper steering shaft mounted with a steering wheel on the rear side of the vehicle body to enable a telescopic movement, thereby transferring rotations of the steering wheel to a steering gear and thus changing a turning angle of traveling wheels.

Before mounting this type of steering apparatus on the vehicle body, to be specific, in a state before a vehicle body fitting bracket is fitted to the vehicle body, e.g., when delivering the steering apparatus or when assembling a column cover, it might happen that the inner column is released from the telescopic clamping by the outer column in the case of operating an operation lever by mistake. In this state, when pulling the steering wheel toward the rear side of the vehicle body, the outer column escapes from the inner column together with the vehicle body fitting bracket, with the result that the steering shaft is released from the spline-fitting as the case may be.

In an electric power steering apparatus, an input shaft on the side of the steering wheel is connected via a torsion bar to an output shaft on the side of the traveling wheels, a torque sensor detects a distortion of the torsion bar, torque acting on the torsion bar is detected from a result of this distortion, and a required steering assist force is given to the output shaft by driving the electric motor.

Therefore, it is necessary that a neutral state of the upper steering shaft on the side of the steering wheel is made coincident highly accurately with a neutral state of the lower steering shaft on the side of the traveling wheels, and assembling is attained by making a phase of the spline of the upper steering shaft to which the rotations of the steering wheel are transferred coincident highly accurately with a phase of the spline of the lower steering shaft to which the rotations of the traveling wheels are transferred. Accordingly, if the steering shaft is once released from the spline-fitting, such a problem arises that there is a time-consuming operation of reassembling the upper steering shaft and the lower steering shaft together in a way that makes the spline phases thereof coincident with each other at the high accuracy.

DOCUMENT OF PRIOR ART

Patent Document

Patent document 1: Japanese Patent Application Laid-Open No. 2010-208588

SUMMARY OF THE INVENTION

Problems to be Solved by the Invention

It is an object of the present invention to provide such a steering apparatus that, even when an inner column is released from being clamped by an outer column in the state before fitting a vehicle body fitting bracket to the vehicle body, any escape of the inner column from the outer column is prevented and spline fitting of the inner column in the outer column is maintained.

Means to Solve the Problems

The problems given above are solved by the following means. Namely, the present invention is a steering apparatus including: an inner column; an outer column being fitted onto the inner column so as to be relatively movable in an axial direction; a clamp mechanism fixing a relative position of the outer column to the inner column; a female steering shaft being rotatably supported on any one of the inner column and the outer column and having its inner peripheral surface formed with a female spline; and a male steering shaft being rotatably supported on the other of the inner column and the outer column, having its outer peripheral surface provided with a male spline inserted and fitted in the female spline, and being capable of moving in the axial direction with respect to the female steering shaft and transferring torque thereto, the steering apparatus being capable of adjusting a telescopic position of a steering wheel fitted to the female steering shaft or the male steering shaft, wherein the female steering shaft and the male steering shaft are provided with a come-out preventive mechanism for preventing an axial escape of the male steering shaft from the female steering shaft in a state where a fitting portion between the female spline and the male spline remains.

Further, in a preferable mode of the present invention, the come-out preventive mechanism is configured by including: an outer peripheral side annular groove formed in the male spline in a peripheral direction; a resiliently deformable ring-shaped member fitted in the outer peripheral side annular groove; and a diameter enlarged portion provided at one portion of the female spline in the axial direction or provided adjacently to an end portion on the side opposite to the male spline insertion side; the diameter enlarged portion is formed to have a diameter larger than a tooth tip circle of the female spline and have a widthwise dimension larger than a widthwise dimension of the ring-shaped member and is provided in a position where the fitting portion between the female spline and the male spline remains in such a state that a relative position of the female steering shaft to the male steering shaft becomes a position in which the diameter enlarged portion and the outer peripheral side annular groove are superposed in a radial direction; and the ring-shaped member gets resiliently deformed upon the male spline abutting on the female spline when inserted into the female spline, enables the male spline to move with respect to the female spline in the axial direction, resiliently returns to enlarge in diameter from a diameter reduced state when the female steering shaft and the male steering shaft make the relative movements in such a direction as to escape as well as in the axial direction in a state after fitting the female spline and the male spline together but before mounting the steering apparatus on the vehicle body, and abuts on the female spline, thereby preventing the axial escape of the male steering shaft from the female steering shaft.

Moreover, in another preferable mode of the present invention, an end portion of the female spline on the male spline insertion side is provided with a chamfer portion; and a large diameter portion having a diameter larger than a tooth bottom circle of the female spline is formed at a portion of the inner peripheral surface of the female steering shaft, i.e., at a portion on the side opposite to the male spline insertion side; the outer peripheral side annular groove of the male spline has its bottom surface formed closer to an inner diametrical side than the tooth bottom circle of the male spline; the ring-shaped member is provided with a chamfer portion on an outer diametrical side, has its outer diameter of which a dimension is formed smaller than a diameter of a tooth tip face of the male spline but larger than a diameter of the tooth bottom circle of the male spline and is positioned within a range of a radial thickness of the chamfer portion provided at the female spline of the female steering shaft of which the outer peripheral surface is disposed coaxially with the male steering shaft as viewed from the axial direction of the male steering shaft; the ring-shaped member, when the male spline is inserted into the female spline, because of the chamfer portion on the outer diametrical side sliding on the chamfer portion of the female spline, gets resiliently deformed to reduce in diameter and gets movable in the axial direction within the outer peripheral side annular groove; and a gap exists between the outer peripheral surface of the ring-shaped member and the inner peripheral surface of the large diameter portion when the ring-shaped member is positioned at the large diameter portion of the female steering shaft.

Furthermore, in still another preferable mode of the present invention, when the female steering shaft and the male steering shaft make the relative movements in the escaping direction as well as in the axial direction, an abutment portion of the female spline on which the ring-shaped member abuts at the diameter enlarged portion is formed on the face vertical to the center axis of the female steering shaft.

Moreover, in a further preferable mode of the present invention, the diameter enlarged portion is formed in a position deviating on such a side that a telescopic adjustment position gets elongated from the movement range of the ring-shaped member with respect to the female steering shaft, which corresponds to the adjustment range of the telescopic position of the steering wheel in a state of assembling the steering apparatus to the vehicle body.

Additionally, in a still further preferable mode of the present invention, if the diameter enlarged portion is provided at one portion of the female spline in the axial direction, a portion of the female spline, i.e., a portion on the side opposite to the male spline insertion side from the diameter enlarged portion has an end portion formed with an inclined portion on the male spline insertion side, and the inclined portion is inclined in such a direction that the portion on the side opposite to the male spline insertion side approaches the center axis of the female steering shaft.

Moreover, in a yet further preferable mode of the present invention, the ring-shaped member has a ring-shaped diameter large portion abutting on the female spline and a resiliently deformable portion which gets resiliently deformed when the large diameter portion abuts on the female spline.

Additionally, in a yet further preferable mode of the present invention, the ring-shaped member is disposed in the outer peripheral side annular groove so that the large diameter portion is directed toward the side opposite to the male spline insertion side.

Furthermore, in an additional preferable mode of the present invention, the resiliently deformable portion is formed in a cone helical shape.

Moreover, in an additional preferable mode of the present invention, the resiliently deformable portion includes a plurality of protrusions formed at the large diameter portion.

Effects of the Invention

In the steering apparatus of the present invention, the female steering shaft and the male steering shaft are provided with the come-out preventive mechanism for preventing the axial escape of the male steering shaft from the female steering shaft in the state where the fitting portion between the female spline and the male spline remains.

Hence, according to the present invention, it is feasible to provide the steering apparatus configured to prevent the upper steering shaft and the lower steering shaft from being released from the spline-fitting without any escape of the inner column from the outer column even when the outer column telescopically unclamps the inner column in the state before fitting the vehicle body fitting bracket of the steering apparatus to the vehicle body

BRIEF DESCRIPTION OF THE DRAWINGS

FIG. 5A is a front view of the come-out preventive member; and FIG. 5B is a sectional view taken along the line 5B-5B in FIG. 5A.

FIGS. 6A and 6B illustrate a modified example of the come-out preventive member; FIG. 6A is a front view of the come-out preventive member; and FIG. 6B is a sectional view taken along the line 6B-6B in FIG. 6A.

FIG. 10A is a front view illustrating a principal portion of the male steering shaft in the state where the come-out preventive member according to the first embodiment is assembled; FIG. 10B is an enlarged view of the portion in the vicinity of the come-out preventive member, illustrating an assembly-underway state of assembling the male steering shaft and the female steering shaft together; FIG. 10C is an enlarged view of a portion in the vicinity of the come-out preventive member in FIG. 10A, illustrating a state of how the come-out preventive member gets deformed; and FIG. 10D is a plan view depicting a state of how the male steering shaft and the female steering shaft are assembled together.

MODE FOR CARRYING OUT THE INVENTION

A first embodiment and a second embodiment of the present invention will hereinafter be described based on the drawings.

Figure 1:
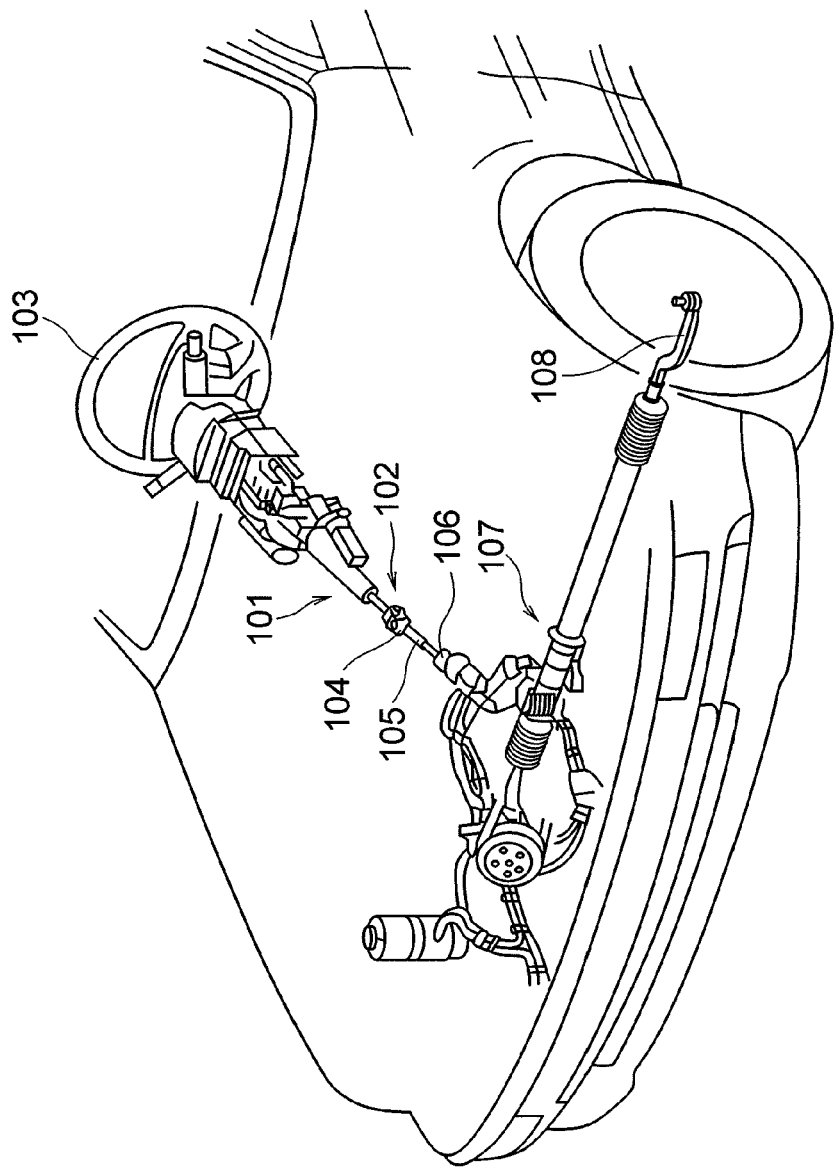
FIG. 1 is a whole perspective view illustrating a state where a steering apparatus 101 in an embodiment of the present invention is mounted on a vehicle.
Figure 2:
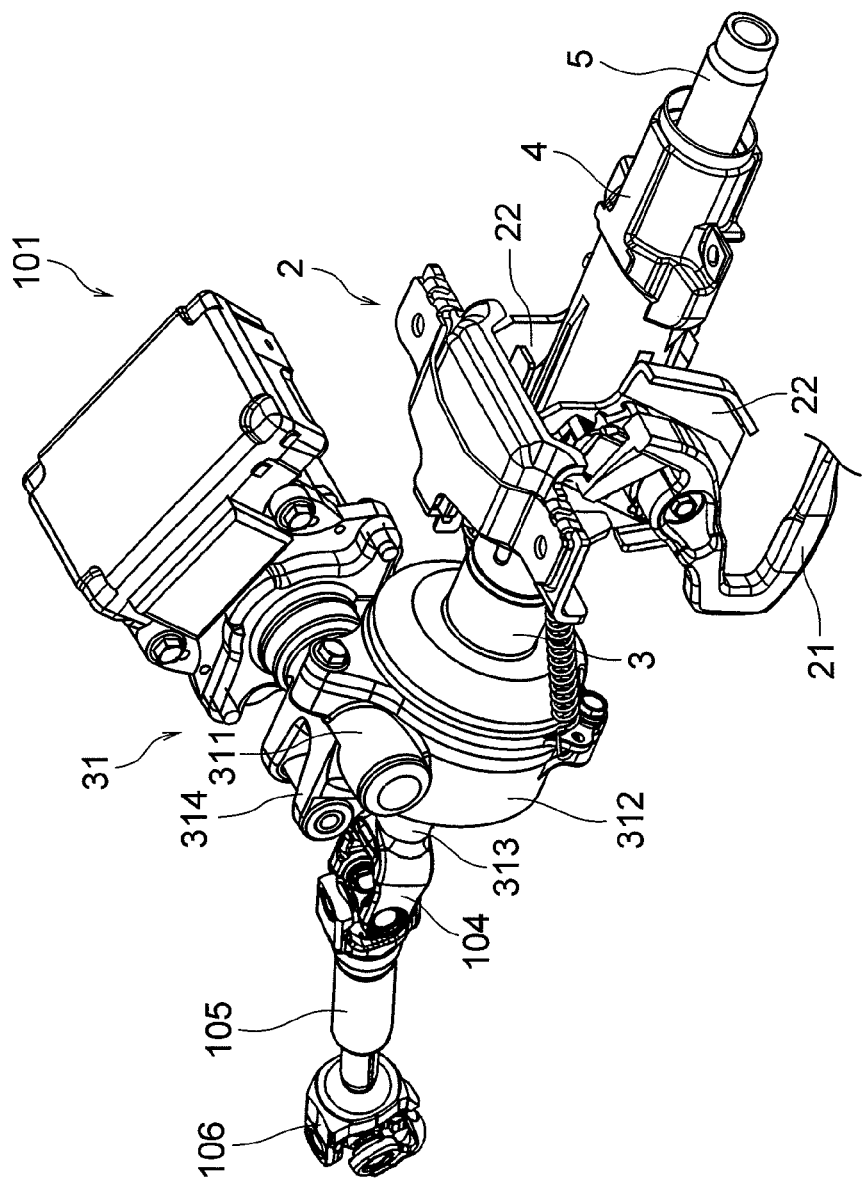
FIG. 2 is a perspective view of a principal portion of the steering apparatus 101 in the embodiment of the present invention as viewed from a rear side of a vehicle body.
Figure 3:
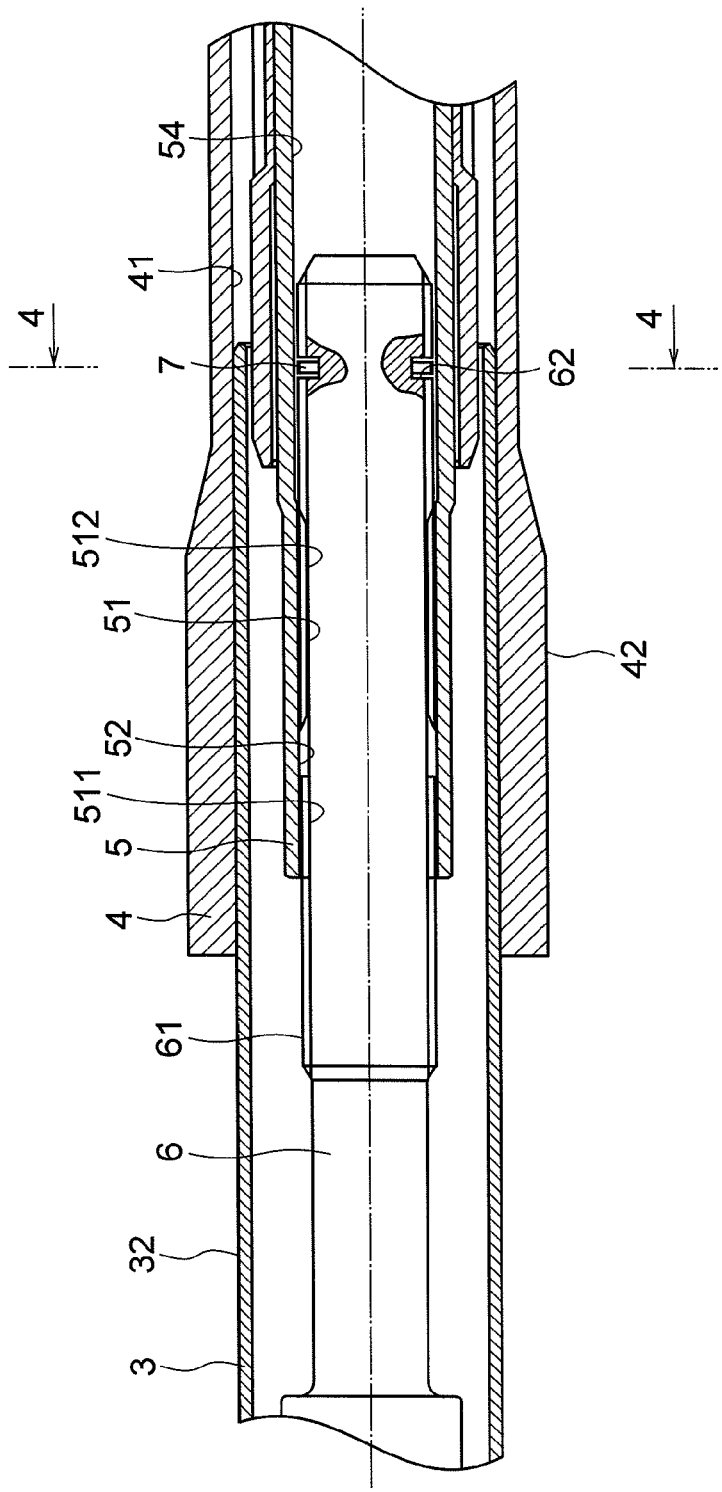
FIG. 3 is a longitudinal sectional view illustrating a fitting state between a female steering shaft and a male steering shaft in the embodiment of the present invention.
Figure 4:
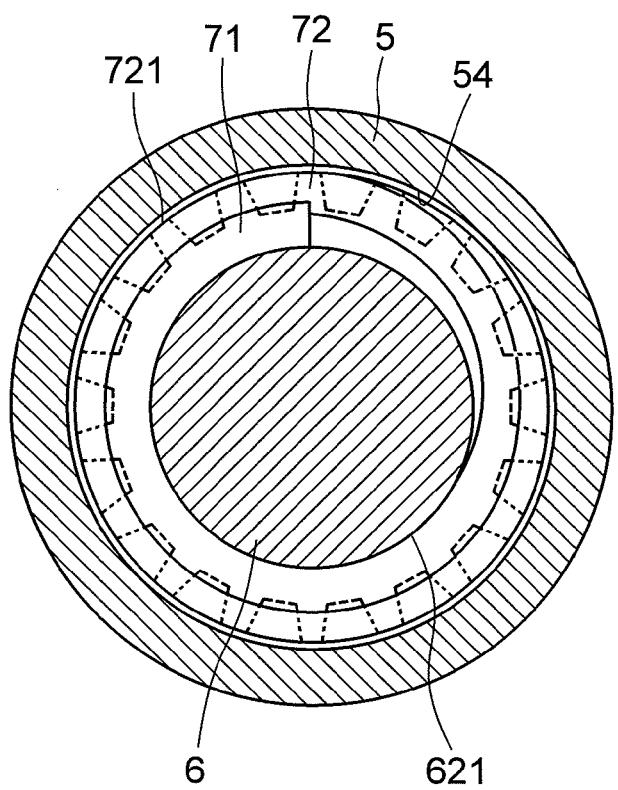
FIG. 4 is a sectional view taken along the line 4-4 in FIG. 3.
Figure 5A:
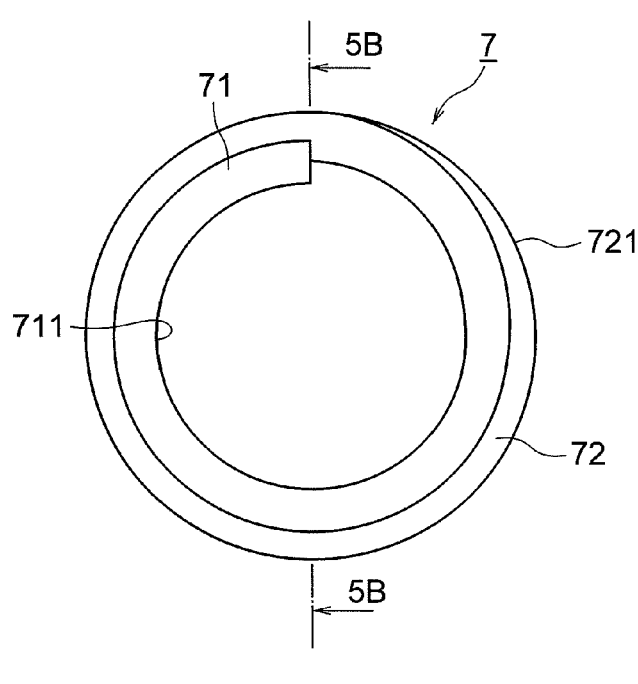
FIGS. 5A and 5B illustrate a come-out preventive member in FIG. 4.

To start with, directions pertaining to a steering apparatus in the present specification will be defined. In the specification, the directions pertaining to the steering apparatus are the same as a back-and-forth direction, a right-and-left direction and an up-and-down direction of a vehicle body in a state of mounting the steering apparatus on the vehicle body unless particularly specified. The right-and-left direction is also referred to as a vehicle widthwise direction. In FIG. 1, when viewing the sheet surface in a state where the reference numerals and symbols in the drawings can be read in normal directions, a left oblique downward direction on the sheet surface corresponds to a front side with respect to the vehicle body; a right oblique upward direction on the sheet surface corresponds to a rear side with respect to the vehicle body; a left oblique upward direction on the sheet surface corresponds to a right side in a vehicle widthwise direction; and a right oblique downward direction on the sheet surface corresponds to a left side in the vehicle widthwise direction. In FIG. 2, when viewing the sheet surface in the state where the reference numerals and symbols in the drawings can be read in the normal directions, a left oblique upward direction on the sheet surface corresponds to the front side with respect to the vehicle body; a right oblique downward direction on the sheet surface corresponds to the rear side with respect to the vehicle body; a right oblique upward direction on the sheet surface corresponds to the right side in the vehicle widthwise direction; and a left oblique downward direction on the sheet surface corresponds to the left side in the vehicle widthwise direction. In FIGS. 3, 5B, 63, 7A, 7B, 8, 9, 10A-10D and 11A-11D, when viewing the sheet surface in the state where the reference numerals and symbols in the drawings can be read in the normal directions, a left direction on the sheet surface corresponds to the front side with respect to the vehicle body; a right direction on the sheet surface corresponds to the rear side with respect to the vehicle body; a depthwise direction on the sheet surface corresponds to the right side in the vehicle widthwise direction; and a near-side direction on the sheet surface corresponds to the left side in the vehicle widthwise direction. In FIG. 4, when viewing the sheet surface in the state where the reference numerals and symbols in the drawings can be read in the normal directions, the depthwise direction on the sheet surface corresponds to the front side with respect to the vehicle body; the near-side direction on the sheet surface corresponds to the rear side with respect to the vehicle body; the right direction on the sheet surface corresponds to the right side in the vehicle widthwise direction; and the left direction on the sheet surface corresponds to the left side in the vehicle widthwise direction. In FIGS. 5A and 6A, when viewing the sheet surface in the state where the reference numerals and symbols in the drawings can be read in the normal directions, the near-side direction on the sheet surface corresponds to the front side with respect to the vehicle body; the depthwise direction on the sheet surface corresponds to the rear side with respect to the vehicle body; the left direction on the sheet surface corresponds to the right side in the vehicle widthwise direction; and the right direction on the sheet surface corresponds to the left side in the vehicle widthwise direction.

The following respective embodiments will discuss examples of applying the present invention to a tilt and telescopic type steering apparatus configured to adjust both of a position of a steering wheel in a vertical direction, i.e., a tilt adjustment position and a position in a back-and-forth direction, i.e., a telescopic adjustment position.

First Embodiment

FIG. 1 is a whole perspective view illustrating a state of mounting a steering apparatus 101 in a first embodiment of the present invention on the vehicle. A steering shaft 102 is rotatably supported on the steering apparatus 101. A steering wheel 103 is fitted to an upper end of the steering shaft 102 on the rear side of the vehicle body, and an intermediate shaft 105 is connected via a universal joint 104 to a lower end of the steering shaft 102 on the front side with respect to the vehicle body.

A universal joint 106 is connected to a lower end of the intermediate shaft 105, and a steering gear assembly 107 configured by including a rack-and-pinion mechanism etc is connected to the universal joint 106.

When a driver rotationally operates the steering wheel 103, a rotation thereof is transferred to the steering gear assembly 107 via the steering shaft 102, the universal joint 104, the intermediate shaft 105 and universal joint 106, and a tie rod 108 is moved via the rack-and-pinion mechanism, thereby changing a turning angle of traveling wheels.

Figure 5B:
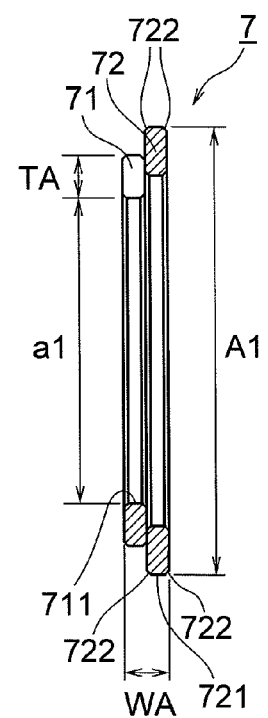
Figure 7A:
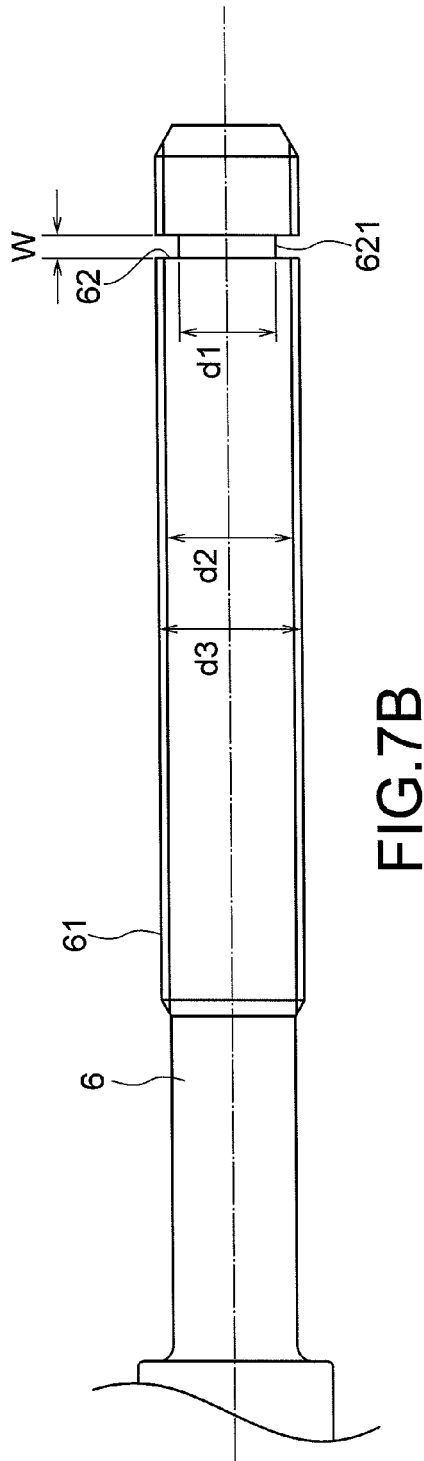
FIG. 7A is a front view illustrating a principal portion of a male steering shaft in FIG. 3.
Figure 7B:
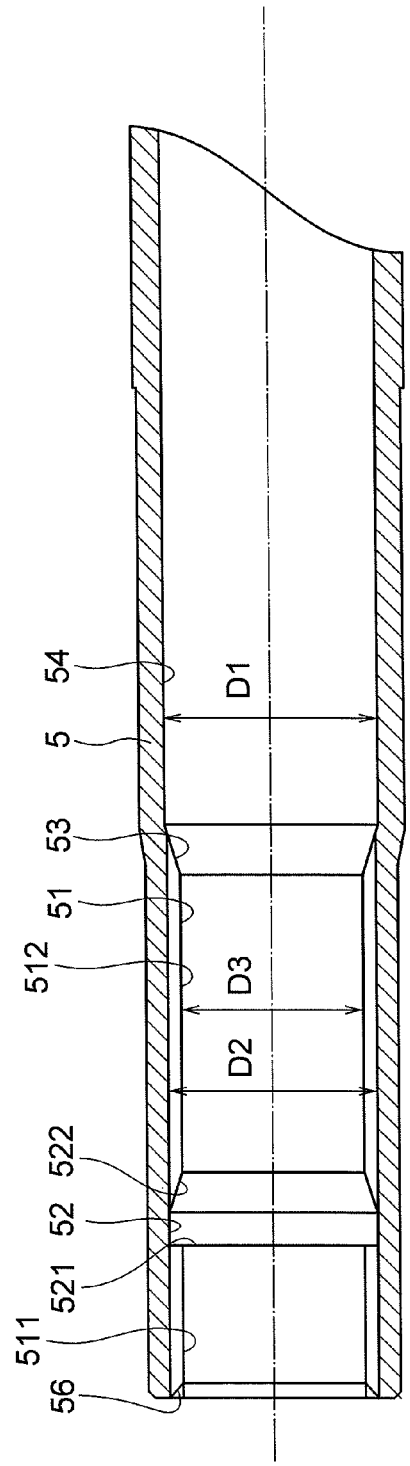
FIG. 7B is a longitudinal sectional view illustrating a principal portion of a female steering shaft in FIG. 3.

FIG. 2 is a perspective view of a principal portion of the steering apparatus 101 in the first embodiment as viewed from the rear side with respect to the vehicle body. FIG. 3 is a longitudinal sectional view illustrating a state of how a male steering shaft is fitted in a female steering shaft in the first embodiment of the present invention. FIG. 4 is a sectional view taken along the line 4-4 in FIG. 3. FIGS. 5A, 5B illustrate a come-out preventive member; FIG. 5A is a front view of the come-out preventive member; and FIG. 5B is a sectional view taken along the line B-B in FIG. 5A. FIG. 7A is a front view illustrating the principal portion of the male steering shaft in FIG. 3, and FIG. 7B is a longitudinal sectional view illustrating the principal portion of the female steering shaft in FIG. 3.

As illustrated in FIG. 2, the steering apparatus 101 in the first embodiment of the present invention is configured by including a vehicle body fitting bracket 2 to be fitted to the vehicle body, an inner column 3 defined as a lower column, a steering assist unit 31 defined as a power assist mechanism, an outer column 4 defined as an upper column, etc.

A right end of the steering assist unit 31 serving as the power assist mechanism is fixed by press-fitting to a portion of the inner column 3 on the front side with respect to the vehicle body. The steering assist unit 31 is configured by including a power motor 311, a reduction gearbox unit 312, and output shaft 313, and so on. The steering assist unit 31 is so supported as to be enabled to adjust a tilt position by mounting a bracket 314 formed integrally with an end portion of the steering assist unit 31 on the front side with respect to the vehicle body in the unillustrated vehicle body via an unillustrated tilt central shaft. Such being the configuration, the inner column 3 is so supported as to be enabled to adjust the tilt position on the vehicle body through the bracket 314.

As depicted in FIGS. 2 and 3, an inner peripheral surface 41 of the outer column 4 is fitted onto an outer peripheral surface 32 of the inner column 3 in the way of being enabled to adjust a telescopic position, i.e., in the way of being slidable in parallel with the line of the central axis of the inner column 3. The female steering shaft 5 is rotatably supported on the outer column 4, and the steering wheel 103 (see FIG. 1) is fixed to the end portion of the female steering shaft 5 on the rear side with respect to the vehicle body (the right side in FIG. 3). An unillustrated slit is formed through the outer column 4 from the outer peripheral surface 42 of the outer column 4 up to the inner peripheral surface 41, in a portion of the outer column 4 on the lower side with respect to the vehicle body.

The male steering shaft 6 is rotatably supported on the inner column 3 and is spline-fitted to the female steering shaft 5. Accordingly, the rotations of the female steering shaft 5 are transferred to the male steering shaft 6 irrespective of the telescopic position of the outer column 4.

The steering assist unit 31 detects torque acting on the male steering shaft 6 and rotates the output shaft 313 by dint of a required steering assist force by driving the power motor 311. Rotations of this output shaft 313 are transferred to the steering gear assembly 107 via the universal joint 104, the intermediate shaft 105 and the universal joint 106, thereby changing the turning angle of the traveling wheels.

The vehicle body fitting bracket 2 is fitted to the front side with respect to the vehicle body in such a manner to be able to make collapsing movement or move forward with respect to the vehicle body when encountering a secondary collision, and a portion of the outer column 4 on the front side with respect to the vehicle body is clamped in between a pair of side plates 22, 22 from both of right and left sides in the vehicle widthwise direction. Note that the collapsing movement connotes a movement toward the front side with respect to the vehicle body while absorbing energy of the secondary collision via an energy absorption mechanism provided at the steering columns, the brackets, etc when encountering the secondary collision.

The tilt position and the telescopic position of the steering wheel 103 are adjusted by rotationally operating an operation lever 21. When rotationally operating the operation lever 21 in such a direction that the pair of side plates 22, 22 of the vehicle body fitting bracket 2 approaches each other, the side plates 22, 22 clamp the outer peripheral surface 42 of the outer column 4. Thereupon, the outer column 4 is clamped by the side plates 22, 22 from the right and left sides, and the steering wheel 103 is positioned in the tilt adjusted position. Simultaneously, with the clamping by the side plates 22, 22, the inner peripheral surface 41 of the outer column 4 gets reduced in diameter, and the outer peripheral surface 32 of the inner column 3 is clamped by the inner peripheral surface 41 of the outer column 4. The inner column 3 is thereby clamped by the inner peripheral surface 41 of the outer column 4, whereby the steering wheel 103 is positioned in the telescopic adjusted position.

The telescopic clamp and the tilt clamp are unclamped by rotationally operating the operation lever 21 in a reversed direction. After performing telescopic and tilt unclamping operations by rotationally operating the operation lever 21 in the reversed direction, there are adjusted both of the position in the vertical direction, i.e., the tilt position and the position in the back and forth direction, i.e., the telescopic position of the steering wheel 103. After the adjustment, as described above, the steering wheel 103 is positioned in the tilt adjusted position and the telescopic adjusted position by rotationally operating the operation lever 21 so that the side plates 22, 22 approach each other.

As depicted in FIG. 3, the male steering shaft 6 spline-engages with the female steering shaft 5 so that a male spline 61 formed on an outer periphery of a portion of the male steering shaft 6 on the rear side of the vehicle body is fitted in a female spline 51 formed in an inner periphery of a portion of the female steering shaft 5 on the front side with respect to the vehicle body. The female spline 51 is, as will be described later on, configured by including a female spline portion 511 provided on the front side with respect to the vehicle body and another female spline portion 512 provided on the rear side with respect to the vehicle body. Further, as illustrated in FIG. 7B, a chamfer 56 is formed at a front edge of the female spline portion 511 on the front side with respect to the vehicle body. The chamfer 56 may be either of a C-chamfer or an R-chamfer. As illustrated in FIGS. 3 and 7A, an outer peripheral annular groove 62 taking a rectangular shape in section is formed in the vicinity of the end portion of the male spline 61 of the male steering shaft 6 on the rear side with respect to the vehicle body, in other words, in the outer peripheral surface in the vicinity of the end portion on an insertion side into the female steering shaft 5. A groove bottom 621 of the outer peripheral annular groove 62 has a diameter smaller than that of a tooth bottom circle of the male spline 61.

A come-out preventive member 7 depicted in FIGS. 5A and 5B is fitted in and thus assembled to this outer peripheral annular groove 62. The come-out preventive member 7 is composed of a resiliently deformable spring steel formed as a coil taking a rectangular shape in section, in which the configuration is a ring on the whole. More specifically, the come-out preventive member 7 is configured as a 2-winding coil spring of which a winding count is "2", in other words, a 2-winding cone helical shape including a first winding 71 and a second winding 72 having a diameter larger than that of the first winding 71. Each of ridge portions of a wire rod is, as illustrated in FIG. 5B, formed with a chamfer 722. The chamfer 722 may be either the C-chamfer or the R-chamfer.

Herein, respective dimensions of the come-out preventive member 7 are defined as depicted in FIG. 5B. Namely, in a free state of the come-out preventive member 7, a ring inner diameter a1 is set as a dimension of an inner diameter of an inner peripheral surface 711 of the first winding 71, and a ring outer diameter A1 is set as a dimension of an outer diameter of an outer peripheral surface 721 of the second winding 72. Further, a ring width WA is set as a dimension of the come-out preventive member 7 in an assembled state in the back-and-forth direction of the vehicle body, and a ring thickness TA is set as a dimension of the wire rod composing the come-out preventive member 7 in the vertical direction of the vehicle body.

Moreover, dimensions of predetermined portions of the male steering shaft 6 and the female steering shaft 5 are defined as illustrated in FIGS. 7A and 7B. At first, with respect to the male steering shaft 6, an outer peripheral annular groove bottom diameter d1 is set as a dimension of the diameter of the groove bottom 621 of the outer peripheral annular groove 62, a male spline small diameter d2 is set as a bottom circle diameter of the male spline 61, a male spline large diameter d3 is set as a tip circle diameter of the male spline 61, and an outer peripheral annular groove width W is set as a dimension of the outer peripheral annular groove 62 in the back-and-forth direction of the vehicle body. The outer peripheral annular groove width W has the dimension larger than the ring width WA of the come-out preventive member 7.

Next, with respect to the female steering shaft 5, a female spline large diameter D2 is set as a bottom circle diameter of the female spline 51, and a female spline small diameter D3 is set as a tip circle diameter of the female spline 51. Further, a female steering shaft inner diameter D1 is set as a diameter of an escape hole 54, which will be described later on, formed in a portion on the rear side with respect to the vehicle body. Note that a chamfer 56 of the female spline 51 is formed to have a thickness corresponding to a difference between the female spline large diameter D2 and the female spline small diameter D3 when the female steering shaft 5 is viewed from the axial direction from the front side with respect to the vehicle body. That is, the chamfer 56 is formed so that the dimension in the direction orthogonal to the axial direction of the female steering shaft 5, i.e., the thickness dimension in the radial direction is equal to the difference between the female spline large diameter D2 and the female spline small diameter D3.

In the free state of the come-out preventive member 7, the ring inner diameter a1 is formed slightly smaller than the outer peripheral annular groove bottom diameter d1. Moreover, the come-out preventive member 7 is assembled to the outer peripheral annular groove 62, in which state the ring outer diameter A1 is formed smaller than the male spline large diameter d3 but larger than the male spline small diameter d2. In other words, an outer peripheral surface 71 of the come-out preventive member 7 is positioned within a range of a tooth height of the male spline 61 as viewed from the axial direction. Further, the ring outer diameter A1 is, in the state where the come-out preventive member 7 is assembled to the outer peripheral annular groove 62, formed larger than the female spline small diameter D3 but smaller than the female spline large diameter D2. In other words, the outer peripheral surface 721 of the second winding 72 of the come-out preventive member 7 assembled to the outer peripheral annular groove 62 is positioned within a range of the thickness of the chamfer 56 of the female steering shaft 5 that is disposed coaxially as viewed from the axial direction.

As depicted in FIGS. 3 and 7B, an inner peripheral annular groove 52 is formed in a portion, vicinal to the front end with respect to the vehicle body, of the female steering shaft 5, i.e., formed in the inner peripheral surface of a portion vicinal to the end portion on the insertion side of the male steering shaft 6. The inner peripheral annular groove 52 corresponds to a portion provided with none of the female spline 51. In other words, the female spline 51 is configured by including the female spline portion 511 on the front side with respect to the vehicle body and the female spline portion 512 on the rear side with respect to the vehicle body, and the inner peripheral annular groove 52 is formed between the female spline portion 511 on the front side with respect to the vehicle body and the female spline portion 512 on the rear side with respect to the vehicle body. Note that the female spline portion 511 on the front side with respect to the vehicle body and the female spline portion 512 on the rear side with respect to the vehicle body are in equiphase. An edge portion, on the rear side with respect to the vehicle body, of the female spline portion 511 on the front side with respect to the vehicle body has a vertical face formed vertically to the center axis of the female steering shaft 5. An edge portion, on the front side with respect to the vehicle body, of the female spline portion 512 on the rear side with respect to the vehicle body has an inclined face 522 inclined in such a direction that the rear side with respect to the vehicle body approaches the center axis. Furthermore, an edge portion, on the rear side with respect to the vehicle body, of the female spline portion 512 on the rear side with respect to the vehicle body has an inclined face 53 inclined in such a direction that the front side with respect to the vehicle body approaches the center axis.

A diameter of the groove bottom of the inner peripheral annular groove 52 is formed to have the same dimension as the female spline large diameter D2. A portion of the inner peripheral annular groove 52 on the front side with respect to the vehicle body, in other words, on the insertion side of the male steering shaft 6 has a shoulder portion 521 configured by including a vertical face of an end portion, on the rear side with respect to the vehicle body, of the female spline portion 511 on the front side with respect to the vehicle body. Further, a portion of the inner peripheral annular groove 52 on the rear side with respect to the vehicle body, in other words, on an opposite insertion side of the male steering shaft 6 has the inclined face 522 of an end portion, on the front side with respect to the vehicle body, of the female spline portion 512 on the rear side with respect to the vehicle body.

Moreover, as illustrated in FIGS. 3 and 7B, the female steering shaft 5 includes the escape hole 54 having a diameter larger than the female spline large diameter D2, which is formed in the inner peripheral surface of the portion closer the rear side with respect to the vehicle body than the female spline portion 512 on the rear side with respect to the vehicle body. A length of the escape hole 54 in the axial direction is formed slightly longer than a telescopic movement distance between the outer column 4 and the inner column 3, and hence the come-out preventive member 7 is enabled to make the telescopic movement smoothly together with the male steering shaft 6 within the escape hole 54. Moreover, a diameter of the escape hole 54, i.e., the female steering shaft inner diameter D1 is formed to have a dimension larger than the ring outer diameter A1 of the escape hole 54, and therefore a gap between the escape hole 54 and the come-out preventive member 7 is formed. Consequently, when making the telescopic movement, the escape hole 54 does not come into contact with the come-out preventive member 7. As a result, the come-out preventive member 7 neither becomes a slide resistance when making the telescopic movement nor causes an abnormal sound (noise) due to the slide.

The outer peripheral surface 32 of the inner column 3 is fitted into the inner peripheral surface 41 of the outer column 4, and the male steering shaft 6 is inserted into the female steering shaft 5, at which time the outer peripheral surface 721 of the come-out preventive member 7 contacts the tip of the female spline 51 and gets resiliently deformed to reduce in diameter, thereby enabling the male steering shaft 6 to be inserted into the female steering shaft 5. An in-depth description of how the come-out preventive member 7 gets resiliently deformed on the occasion of inserting the male steering shaft 6 into the female steering shaft 5 will hereinafter be made.

FIG. 10A is a front view illustrating a principal portion of the male steering shaft 6 in the state where the come-out preventive member 7 according to the first embodiment is assembled; FIG. 10B is an enlarged view of the portion in the vicinity of the come-out preventive member 7, illustrating an assembly-underway state of assembling the male steering shaft 6 and the female steering shaft 5 together; FIG. 10C is an enlarged view of a portion in the vicinity of the come-out preventive member 7 in FIG. 10A, illustrating a state of how the come-out preventive member 7 gets deformed; and FIG. 10D is a plan view depicting a state of how the male steering shaft 6 and the female steering shaft 5 are assembled together.

As illustrated in FIG. 10A, in the state of assembling the come-out preventive member 7 into the outer peripheral annular groove 62, the outer peripheral surface of the first winding 71 is positioned closer to the inner diametrical side than the tooth bottom of the male spline 61, and the outer peripheral surface 721 of the second winding 72 is positioned closer to the inner diametrical side than the tooth tip and on the outer diametrical side from the tooth bottom of the male spline 61. Further, in the come-out preventive member 7, the first winding 71 is disposed on the rear side with respect to the vehicle body, and the second winding 72 is disposed on the front side with respect to the vehicle body. The come-out preventive member 7 is disposed in this direction, thereby improving an assembling property between the male steering shaft 6 and the female steering shaft 5. The ring inner diameter al (see FIG. 5B) of the come-out preventive member 7 is formed slightly smaller than the outer peripheral annular groove bottom diameter d1 (see FIG. 7A), and hence the come-out preventive member 7 is fitted with no backlash by clamping the outer peripheral annular groove 62.

From this state, the end portion of the male steering shaft 6 on the rear side with respect to the vehicle body and the end portion of the female steering shaft 5 on the front side with respect to the vehicle body are set in a face-to-face relation with respect to the axial direction, and the male spline 61 and the female spline 51 are fitted together by moving the male steering shaft 6 and the female steering shaft 5 in such a direction as to approach each other. Thereupon, the end portion of the female spline 51 on the front side with respect to the vehicle body abuts on the portion of the outer diametrical side of the second winding 72 of the come-out preventive member 7. Furthermore, when fitting the male spline 61 and the female spline 51 together, the come-out preventive member 7 is, as illustrated in FIG. 10B, pushed by the female spline 51, and the whole come-out preventive member 7 is moved up to the end portion of the outer peripheral annular groove 62 on the front side with respect to the vehicle body.

The chamfer 56 is formed at the end portion of the female spline 51 on the front side with respect to the vehicle body, and the chamfer 722 is also formed at the portion of the outer diametrical side of the second winding 72 of the come-out preventive member 7. Therefore, when further fitting the male spline 61 and the female spline 51 together, the chamfer 56 and the chamfer 722 slide on each other. Then, as depicted in FIG. 10C, the second winding 72 smoothly relative moves to the tooth tip of the female spline 51 from the chamfer 56, thereby getting resiliently deformed to reduce in diameter. Simultaneously, the whole come-out preventive member 7 gets resiliently deformed and stretches in the back-and-forth direction of the vehicle body. At this time, the come-out preventive member 7 is positioned at the end portion of the outer peripheral annular groove 62 but is disabled from stretching toward the front side of the vehicle body and therefore stretches, it follows, toward the rear side with respect to the vehicle body. As a result, it follows that the first winding 71 moves toward the rear side with respect to the vehicle body as depicted in FIG. 10O. Thus, the outer peripheral annular groove width W (see FIG. 7A) is formed to have a dimension well larger than the ring width WA (see FIG. 5B) of the come-out preventive member 7 so that the come-out preventive member 7 can stretch in the back-and-forth direction of the vehicle body. Thereafter, as illustrated in FIG. 10D, the male steering shaft 6 is assembled to the female steering shaft 5 by further fitting the male spline 61 and the female spline 51 together.

Upon completion of inserting the male steering shaft 6 into the female steering shaft 5 and when the come-out preventive member 7 reaches the escape hole 54, the second winding 72 of the come-out preventive member 7 resiliently returns and enlarges in diameter, and simultaneously the whole come-out preventive member 7 resiliently returns to get contracted in the back-and-forth direction of the vehicle body. As a result, the ring outer diameter A1 (see FIG. 5B) of the come-out preventive member 7 comes to the same state as the state depicted in FIG. 10A. In this state, the male steering shaft 6 is spline-fitted in the female steering shaft 5 and is telescopically movable, while the come-out preventive member 7 is telescopically movable together with the male steering shaft 6 within the escape hole 54. The inner peripheral surface 711 of the come-out preventive member 7 clamps, as described above, the groove bottom 621 of the outer peripheral annular groove 62 of the male steering shaft 6, and hence the come-out preventive member 7 is fitted in the outer peripheral annular groove 62 without any backlash, resulting in no emission of the abnormal sound (noise) during the drive operation.

In the normal state after assembling the steering apparatus in the vehicle body, when the come-out preventive member 7 adjusts the telescopic position from the state of positioning within the range of the escape hole 54, the outer peripheral surface 721 of the come-out preventive member 7 abuts on the inclined face 53 of the end portion, on the rear side with respect to the vehicle body, of the female spline portion 512 on the rear side with respect to the vehicle body by pulling the outer column 4 toward the rear side with respect to the vehicle body, at which time the come-out preventive member 7 gets smoothly shrunk in diameter because of the chamfer 722 being formed on the outer peripheral surface 721 of the second winding 72 of the come-out preventive member 7 and because of the second winding 72 being guided by the inclined face 53. It is therefore feasible to make the telescopic movement by further pulling the outer column 4 toward the rear side with respect to the vehicle body while bringing the outer peripheral surface 721 of the come-out preventive member 7 into contact with the tooth tip of the female spline portion 512.

Note that the adjustment range of the telescopic position of the steering wheel 103 (see FIG. 1) in the normal state after being assembled to the vehicle body is set to a range till the come-out preventive member 7 moves to the position in the vicinity of the end portion, on the front side with respect to the vehicle body, of the female spline portion 512 from the predetermined position of the escape hole 54. Namely, the come-out preventive member 7 is positioned in the predetermined position of the escape hole 54 when a length of the portion where the male spline 61 of the male steering shaft 6 engages with the female spline 51 of the female steering shaft 5 is maximum, i.e., when the steering shaft becomes shortest. Further, the come-out preventive member 7 is positioned in the vicinity of the end portion, on the front side with respect to the vehicle body, of the female spline portion 512 on the rear side with respect to the vehicle body when the length of the portion where the male spline 61 engages with the female spline 51 is minimum, i.e., when the steering shaft becomes longest. Such being the configuration, the inner peripheral annular groove 52 is formed in the position deviating on such a side that the telescopic adjustment position gets elongated from the movement range of the come-out preventive member 7 with respect to the female spline shaft 5, which corresponds to the adjustment range of the telescopic position of the steering wheel 103. That is, in the adjustment range of the normal telescopic position, it does not happen that the come-out preventive member 7 is positioned in the inner peripheral annular groove 52. In other words, it follows that the come-out preventive member 7 is positioned in the inner peripheral annular groove 52 when in the fitting state where the length of the portion where the male steering shaft 6 is fitted in the female steering shaft 5 is shorter than when coming to the shortest range of the normal adjustment.

Before mounting the steering apparatus 101 having the configurations of the steering shafts such as this, it might happen that the inner column 3 is released from the telescopic clamping and the tilt clamping by the outer column 4 when operating the operation lever 21 by mistake, to be specific, in the state before assembling the vehicle body fitting bracket 2 to the vehicle body such as in delivery and assembling an unillustrated column cover. In the first embodiment, in this case, when making the relative movement in such a direction that the male steering shaft 6 escapes from the female steering shaft 5, the come-out preventive member 7 is intruded into the inner peripheral annular groove 52 in the vicinity of the end portion of the female spline 51 on the front side with respect to the vehicle body to enlarge in diameter. Thereupon, the second winding 72 of the come-out preventive member 7 abuts on the shoulder portion 521 of the end portion of the inner peripheral annular groove 52 on the front side with respect to the vehicle body. At this time, the abutment portion where the second winding 72 abuts on the shoulder portion 521 is an end face of the second winding 72 on the front side with respect to the vehicle body. The shoulder portion 521 is a vertical face on which the end portion of the female spline portion 511 on the rear side with respect to the vehicle body is formed vertically to the center axis of the female steering shaft 5, and hence the second winding 72 of the come-out preventive member 7 cannot reduce in diameter even when abutting on the shoulder portion 521. Consequently, the male steering shaft 6 is disabled from moving further in such a direction as to escape from the female steering shaft 5. As a result, it is feasible to surely prevent the escape of the male steering shaft 6 from the female steering shaft 5. Namely, the inner column 3 can be certainly prevented from escaping out of the outer column 4.

Furthermore, in this state, the male spline 61 of the portion closer to the front side with respect to the vehicle body than the outer peripheral annular groove 62 is fitted in the female spline portion 511 on the front side with respect to the vehicle body. Moreover, the male spline 61 of the portion closer to the rear side with respect to the vehicle body than the outer peripheral annular groove 62 is fitted in the female spline portion 512 on the rear side with respect to the vehicle body. The phase of the male spline 61 and the phase of the female spline 51 are thus retained.

In this way, the second winding 72 of the portion, exhibiting the large diameter, of the come-out preventive member 7 abuts on the shoulder portion 521, thereby preventing the male steering shaft 6 from escaping out of the female steering shaft 5. That is, the come-out preventive member 7 has the configuration that the second winding 72 having the large diameter builds up the come-out preventive portion to prevent the male steering shaft 6 from coming out the female steering shaft 5, and the whole portion including the first winding 71 builds up the resilient deforming portion which gets resiliently deformed when assembling the male steering shaft 6 and the female steering shaft 5 together.

When the outer column 4 is telescopically moved as pushed toward the front side with respect to the vehicle body from the state where the come-out preventive member 7 is intruded into the inner peripheral annular groove 52 of the female spline 51 to enlarge in diameter, the outer peripheral surface 721 of the come-out preventive member 7 is guided to the inclined face 522 of the end portion of the inner peripheral annular groove 52 on the rear side of the vehicle body and thus smoothly reduces in diameter. Accordingly, the telescopic movement can be continued by further pushing the outer column 4 toward the front side with respect to the vehicle body while bringing the outer peripheral surface 721 of the come-out preventive member 7 into contact with the tooth tip of the female spline portion 512 on the rear side with respect to the vehicle body. Thus, the male steering shaft 6 is prevented from escaping out of the female steering shaft 5, and further the female steering shaft 5 and the male steering shaft 6 can be returned to the original states through the normal telescopic movements.

In the first embodiment, the male steering shaft 6 can be surely prevented from escaping out of the female steering shaft 5 simply by assembling the male steering shaft 6 into the female steering shaft 5 in the normal assembling procedure, and therefore it is preferable that the assembly work is simple. Further, the come-out preventive structure affects just slightly the external shape of the steering apparatus and the vehicle body because of being the internal structure built up within the outer column 4 and the inner column 3 and can be applied to many types of steering apparatuses.

Note that the come-out preventive member 7 may be configured by use of a wire in the first embodiment. The wire take a circular shape in section and therefore has no necessity for undergoing the chamfering, whereby the number of steps and a manufacturing cost can be reduced.

Modified Example

Next, a modified example of the first embodiment will be described. The modified example is different in terms of a form of the come-out preventive member from the first embodiment, but other constructions are the same. Therefore, in the following discussion, the description will be focused on the different configuration, and the repetitive explanations are omitted as the case may be. Further, the same components are marked with the same numbers and symbols, and the description will be made by diverting the drawings used in the first embodiment to the modified example.

FIGS. 6A and 6B illustrate modified examples of the come-out preventive member; FIG. 6A is a front view of the modified example of the come-out preventive member; and FIG. 6B is a sectional view taken along the line 6B-6B in FIG. 6A. A come-out preventive member 8 in the modified example is configured in a substantially ring-like C-shape with a circle being partially notched by use of the wire rod composed of the resiliently deformable spring steel and taking the rectangular shape in section. An inner peripheral surface 81 of a C-shaped portion 80 formed in the C-shape is provided with seven pieces of protrusions 82 protruding toward the axial center and disposed at equal intervals in the peripheral direction. One of these seven protrusions 82 is in the face-to-face relation with the notched portion of the C-shaped portion 80, while the remaining protrusions 82 are paired in the face-to-face relation about the center axis of the C-shaped portion 80, thus forming three pairs of protrusions. Each of the protrusions 82 is formed by its being bent just at a predetermined angle α in the same direction in the way of being raised from the inner peripheral surface 81 as viewed from the direction orthogonal to the center axis.

Herein, the respective dimensions of the come-out preventive member 8 will be defined as illustrated in FIGS. 6A and 6B. Specifically, a ring outer diameter B1 is set as a dimension of the outer diameter of the outer peripheral surface 83 of the C-shaped portion 80, and a ring inner diameter b1 is set as a distance between tips of the face-to-face protrusions 82, 82. Further, a ring width WB is set as a dimension in the back-and-forth direction of the vehicle body in the state where the come-out preventive member 8 is assembled, and a ring thickness TB is set as a dimension of the wire rod composing the C-shaped portion 80 in the back-and-forth direction of the vehicle body. Note that the outer peripheral annular groove width W (see FIG. 7A) has a dimension larger than the ring width WB.

In the free state of the come-out preventive member 8, a protrusion edge of the protrusion 82 is formed to protrude toward the inner diametrical side from the groove bottom 621 of the outer peripheral annular groove 62.

Moreover, in the state of fitting and assembling the come-out preventive member 8 in the outer peripheral annular groove 62 of the male steering shaft 6, the ring outer diameter B1 is formed to have a dimension smaller than a male spline large diameter d3 but larger than a male spline small diameter d2. In other words, the outer peripheral surface 83 of the come-out preventive member 8 is positioned within a range of the tooth height of the male spline 61 as viewed from the axial direction. Still further, the ring outer, diameter B1 is formed larger than the female spline small diameter D3 but smaller than the female spline large diameter D2 in the state of assembling the come-out preventive member 8 in the outer peripheral annular groove 62. In other words, the outer peripheral surface 83 of the come-out preventive member 8 assembled in the outer peripheral annular groove 62 is positioned within the range of the diametrical thickness of the chamfer 56 of the female steering shaft 5 that is coaxially disposed as viewed from the axial direction. The protrusion 82 is bent just at the angle α, thereby facilitating resilient deformation of the protrusion 82 and thus enabling the C-shaped portion 80 of the come-out preventive member 8 to smoothly enlarge and reduce in diameter.

The resilient deformation of the come-out preventive member 8 when inserting the male steering shaft 6 into the female steering shaft 5 will hereinafter be described.

Figure 11A:
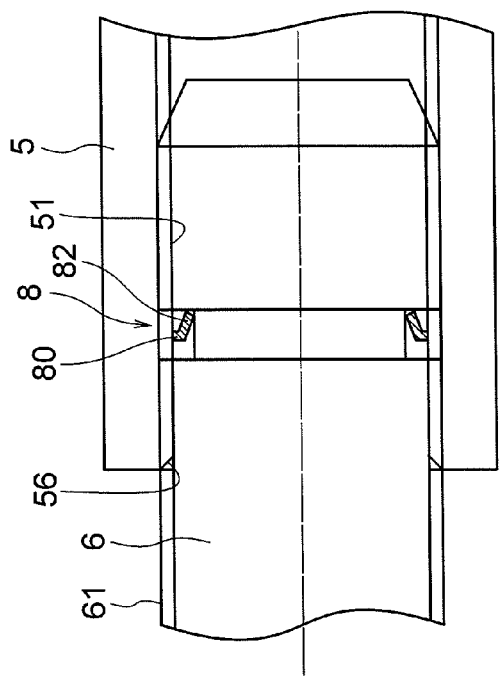
FIG. 11A is a front view illustrating the principal portion of the male steering shaft in the state of assembling the come-out preventive member according to a modified example of the first embodiment.
Figure 11B:
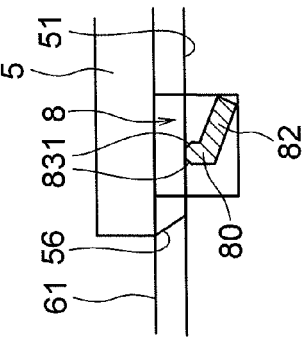
FIG. 11B is an enlarged view of a portion in the vicinity of the come-out preventive member in FIG. 11A, illustrating an assembly-underway state of how the male steering shaft and the female steering shaft are assembled together.
Figure 11D:
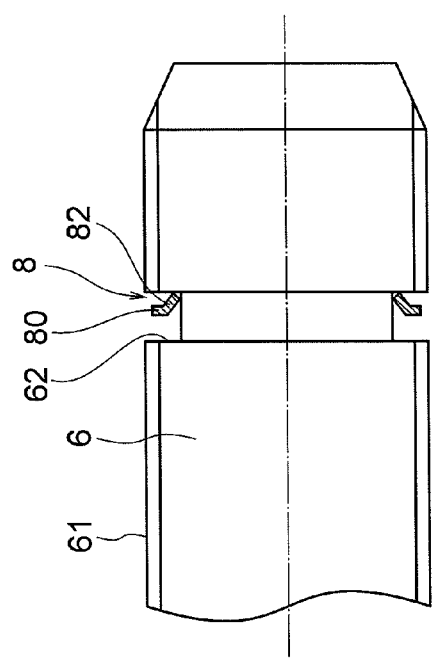
FIG. 11D is a front view illustrating an assembled state of the male steering shaft and the female steering shaft.
Figure 11C:
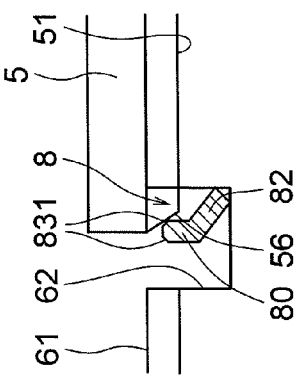
FIG. 11C is an enlarged view of the portion in the vicinity of the come-out preventive member in FIG. 11A, depicting a state of how the come-out preventive member gets deformed.

FIG. 11A is a front view illustrating the principal portion of the male steering shaft 6 in the state of assembling the come-out preventive member 8 according to the modified example of the first embodiment; FIG. 11B is an enlarged view of a portion in the vicinity of the come-out preventive member 8 in FIG. 11A, illustrating an assembly-underway state of how the male steering shaft 6 and the female steering shaft 5 are assembled together; FIG. 11C is an enlarged view of the portion in the vicinity of the come-out preventive member 8 in FIG. 11A, depicting a state of how the come-out preventive member 8 gets deformed; and FIG. 11D is a front view illustrating an assembled state of the male steering shaft 6 and the female steering shaft 5.

As illustrated in FIG. 11A, in the state where the come-out preventive member 8 is assembled in the outer peripheral annular groove 62, the outer peripheral surface 83 is positioned closer to the inner diametrical side than the tooth tip of the male spline 61. The come-out preventive member 8 is disposed so that the tip side of each protrusion 82 is directed to the rear side with respect to the vehicle body, while the C-shaped portion 80 is directed to the front side with respect to the vehicle body. The come-out preventive member 8 is disposed in this direction, thereby improving the assembling property between the male steering shaft 6 and the female steering shaft 5. The come-out preventive member 8 is configured such that the protrusion edge of the protrusion 82 gets more protruded on the inner diametrical side than the groove bottom 621 of the outer peripheral annular groove 62 in the free state, and hence the ring inner diameter b1 (see FIG. 6A) of the come-out preventive member 8 is formed slightly smaller than the outer peripheral annular groove bottom diameter d1 (see FIG. 7A). Therefore, the come-out preventive member 8 is fitted without any backlash in the manner that the respective protrusions 82 clamp the outer peripheral annular groove 62.

From this state, the end portion of the male steering shaft 6 on the rear side with respect to the vehicle body and the end portion of the female steering shaft 5 on the front side with respect to the vehicle body are set in the opposed or face-to-face relation in the axial direction, and the male steering shaft 6 and the female steering shaft 5 are fitted together by moving these shafts 5, 6 in such a direction as to approach each other. Namely, the male spline 61 and the female spline 51 are fitted together. Thereupon, as illustrated in FIG. 11B, the end portion of the female spline 51 abuts on the C-shaped portion 80 of the come-out preventive member 8.

The end portion of the female spline 51 on the front side of the vehicle body is formed with the chamfer 56, and the outer peripheral surface 83 of the C-shaped portion 80 is also formed with a chamfer 831 whereby the chamfer 56 and the chamfer 831 slide on each other when the male steering shaft 6 is further fitted in the female steering shaft 5. Then, as illustrated in FIG. 11C, the C-shaped portion 80 smoothly relatively moves toward the tooth tip from the chamfer 56 of the female spline 51, whereby a gap of the notched portion is narrowed to reduce in diameter. Simultaneously, each protrusion 82 gets resiliently deformed to fall down in the direction parallel to the groove bottom 621 of the outer peripheral annular groove 62. Thus, the outer peripheral annular groove width W (see FIG. 7A) is formed to have a dimension well larger than the ring width WB (see FIG. 6B) of the come-out preventive member 8 to enable the C-shaped portion 80 of the come-out preventive member 8 to move in the back-and-forth direction of the vehicle body. Thereafter, the male spline 61 is further fitted in the female spline 51, and, as depicted in FIG. 11D, the male steering shaft 6 and the female steering shaft 5 are assembled together. Note that the come-out preventive member 8 is entirely pushed by the female spline 51, then moved to the end portion of the outer peripheral annular groove 62 on the front side of the vehicle body and thereafter reduces in diameter and gets resiliently deformed as the case may be.

Upon completion of inserting the male steering shaft 6 into the female steering shaft 5 and when the come-out preventive member 8 reaches the escape hole 54, the C-shaped portion 80 of the come-out preventive member 8 resiliently returns to enlarge in diameter, and the ring outer diameter B1 of the come-out preventive member 8 comes to the same state as illustrated in FIG. 11A.

Thus, the male steering shaft 6 is spline-fitted in the female steering shaft 5 to be telescopically movable, and the come-out preventive member 8 becomes movable together with the male steering shaft 6 within the escape hole 54. The protrusion edge of each of the protrusions 82 clamps, as described above, the groove bottom 621 of the outer peripheral annular groove 62 of the male steering shaft 6, and hence the come-out preventive member 8 is fitted in the outer peripheral annular groove 62 without any backlash, which does not cause the abnormal sound during the drive operation. Moreover, the angle α of the protrusion 82 can be set to an angle which facilitates the assembly between the male steering shaft 6 and the female steering shaft 5, depending on the type of the steering apparatus. Other effects are the same as those in the first embodiment.

In the present modified example also, before mounting the steering apparatus 101 on the vehicle body, when the operation lever 21 is operated by mistake and the inner column 3 is released from the telescopic clamping and the tilt clamping, in which case the male steering shaft 6 can be prevented from escaping out of the female steering shaft 5.

When making the relative movement in such a direction that the male steering shaft 6 escapes from the female steering shaft 5, the C-shaped portion 80 of the come-out preventive member 8 is intruded into the inner annular groove 52 of the female spline 51 and resiliently returns to enlarge in diameter. Thereupon, the C-shaped portion 80 of the come-out preventive member 8 abuts on the shoulder portion 521 of the end portion of the inner annular groove 52 on the front side with respect to the vehicle body. At this time, the abutment portion of the C-shaped portion 80, which abuts on the shoulder portion 521, is the end face of the C-shaped portion 80 on the front side with respect to the vehicle body. The shoulder portion 521 is a vertical face on which the end portion of the female spline portion 511 on the rear side with respect to the vehicle body is formed vertically to the center axis of the female steering shaft 5, and hence the C-shaped portion 80 of the come-out preventive member 8 cannot reduce in diameter even when abutting on the shoulder portion 521. Consequently, the male steering shaft 6 is disabled from moving further in such a direction as to escape from the female steering shaft 5. As a result, it is feasible to surely prevent the escape of the male steering shaft 6 from the female steering shaft 5. Namely, the inner column 3 can be certainly prevented from escaping out of the outer column 4.

Furthermore, in this state, the male spline 61 of the portion closer to the front side with respect to the vehicle body than the outer peripheral annular groove 62 is fitted in the female spline portion 511 on the front side with respect to the vehicle body. Moreover, the male spline 61 of the portion closer to the rear side of the vehicle body than the outer peripheral annular groove 62 is fitted in the female spline portion 512 on the rear side of the vehicle body. The phase of the male spline 61 and the phase of the female spline 51 are thus retained.

In this way, the C-shaped portion 80 of the come-out preventive member 8 abuts on the shoulder portion 521, thereby preventing the male steering shaft 6 from escaping out of the female steering shaft 5. That is, the come-out preventive member 8 has the configuration that the C-shaped portion 80 taking substantially the ring-shape and having the large diameter builds up the come-out preventive portion to prevent the male steering shaft 6 from coming out the female steering shaft 5, and the respective protrusions 82 provided on the inner diametrical side of the C-shaped portion 80 build up the resilient deforming portion which gets resiliently deformed when assembling the male steering shaft 6 and the female steering shaft 5 together.

When the outer column 4 is telescopically moved as pushed toward the front side of the vehicle body from the state where the C-shaped portion 80 of the come-out preventive member 8 is intruded into the inner peripheral annular groove 52 of the female spline 51 to enlarge in diameter, the outer peripheral surface 83 of the C-shaped portion 80 is guided to the inclined face 522 of the end portion of the inner peripheral annular groove 52 on the rear side with respect to the vehicle body, whereby the C-shaped portion 80 smoothly reduces in diameter. Accordingly, the telescopic movement can be continued by further pushing the outer column 4 toward the front side of the vehicle body while bringing the outer peripheral surface 83 of the C-shaped portion 80 into contact with the tooth tip of the female spline portion 512 on the rear side with respect to the vehicle body. Thus, in the present modified example also, the male steering shaft 6 is prevented from escaping out of the female steering shaft 5, and further the female steering shaft 5 and the male steering shaft 6 can be returned to the original states through the normal telescopic movements. Other effects are the same as those in the first embodiment.

Second Embodiment

Figure 8:
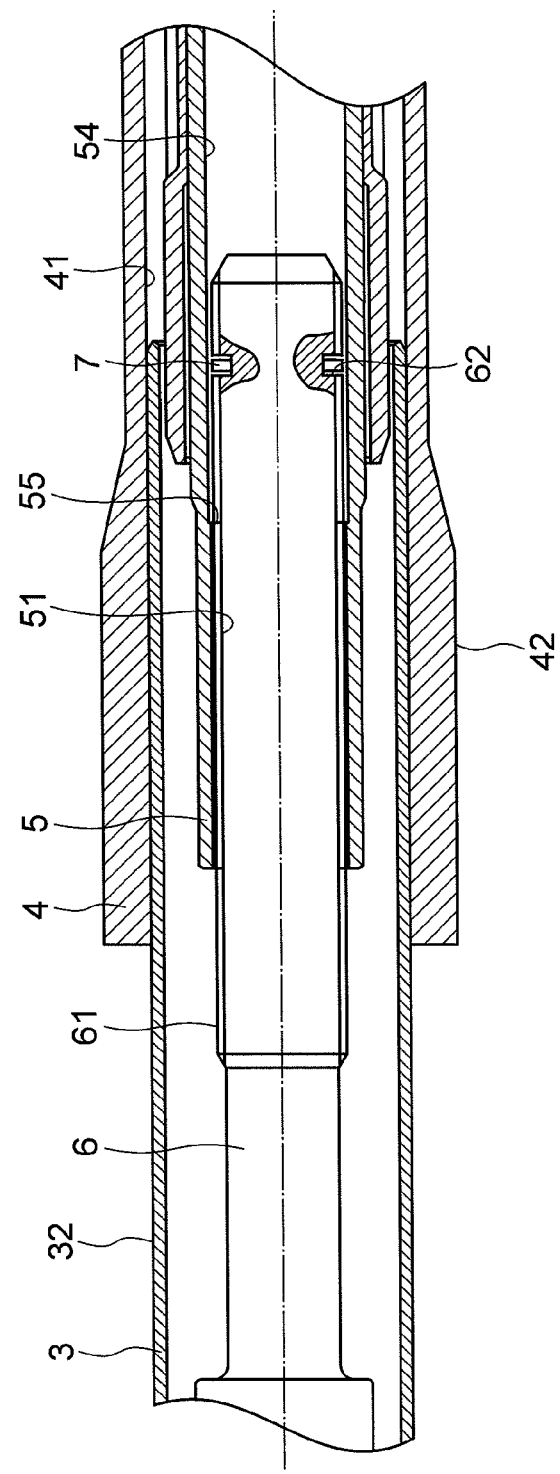
FIG. 8 is a longitudinal sectional view illustrating a fitting state between the female steering shaft and the male steering shaft in a second embodiment of the present invention.

Next, a second embodiment will be described. FIG. 8 is a longitudinal sectional view illustrating a fitted state between the female steering shaft 5 and the male steering shaft 6 in the second embodiment of the present invention. FIG. 8 is a longitudinal sectional view illustrating a principal portion of the female steering shaft. In the following discussion, the description will be focused on the different configuration, and the repetitive explanations are omitted as the case may be. Further, the same components are marked with the same numbers and symbols, and the description will be made by diverting the drawings used in the first embodiment to the second embodiment. The second embodiment is given by way of a modified example of the first embodiment, in which the shape of the female steering shaft 5 is changed.

Figure 9:
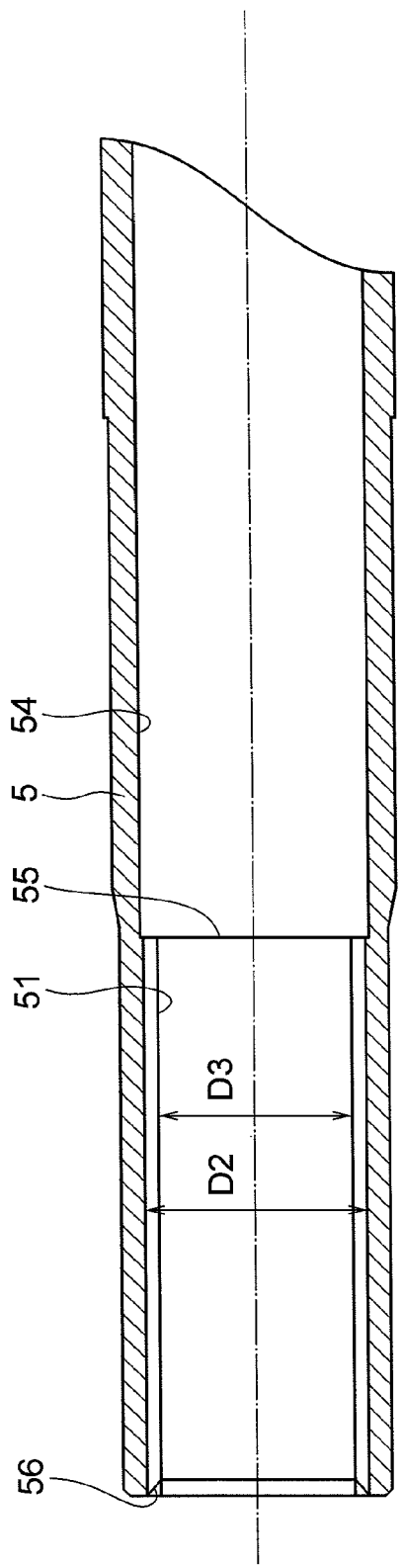
FIG. 9 is a longitudinal sectional view illustrating a principal portion of the female steering shaft in FIG. 8.

In the second embodiment, the male steering shaft 6 and the come-out preventive member 7 are the same as those in the first embodiment, and hence the in-depth descriptions of the male steering shaft 6 and the come-out preventive member 7 are omitted. To be specific, the coil-like come-out preventive member 7 is assembled in the outer peripheral annular groove 62 in the vicinity of the end portion of the male spline 61 on the rear side with respect to the vehicle body. Further, in the second embodiment, as illustrated in FIG. 9, unlike the first embodiment, the inner peripheral annular groove 52 is not formed in the vicinity of the end portion of the female spline 51 of the female steering shaft 5, i.e., in the inner peripheral surface in the vicinity of the end portion on the insertion side of the male steering shaft 6.

The escape hole 54 of which the diameter is larger than the diameter of the tooth bottom circle of the female spline 51, i.e., than the female spline large diameter D2 is formed in the inner peripheral surface of the portion of the female steering shaft 5, which is closer to the rear side of the vehicle body than the female spline 51. The length of the escape hole 54 in the axial direction is formed slightly longer than the telescopic movement distance between the outer column 4 and the inner column 3, and hence the come-out preventive member 7 is enabled to make the telescopic movement smoothly together with the male steering shaft 6 within the escape hole 54.

Moreover, a shoulder portion 55, which connects the female spline 51 to the escape hole 54, is formed at the end portion of the female spline 51 on the rear side with respect to the vehicle body, i.e., at the end portion of the male steering shaft 6 on the opposite side to the insertion side thereof. The shoulder portion 55 is a vertical face on which the end portion of the female spline 51 on the rear side with respect to the vehicle body is formed vertically to the center axis of the female steering shaft 5.

Similarly to the first embodiment, the outer peripheral surface 32 of the inner column 3 is fitted in the inner peripheral surface 41 of the outer column 4, and, when inserting the male steering shaft 6 into the female steering shaft 5, the outer peripheral surface 721 of the second winding 72 of the come-out preventive member 7 comes into contact with the chamfer 56 of the female spline 51 and with the tooth tip and gets resiliently deformed to reduce in diameter, thereby enabling the male steering shaft 6 to be inserted into the female steering shaft 5.

Upon completion of inserting the male steering shaft 6 into the female steering shaft 5 and when the come-out preventive member 7 moves to the escape hole 54, the outer peripheral surface 721 of the second winding 72 of the come-out preventive member 7 gets resiliently returned to enlarge in diameter, and the dimension of the outer diameter of the outer peripheral surface 721 of the come-out preventive member 7, i.e., the outer diameter A1 of the ring A (see FIG. 5B) becomes the same state as the state depicted in FIG. 10A. In this state, the male steering shaft 6 is spline-fitted in the female steering shaft 5 and is telescopically movable, and the come-out preventive member 7 is also telescopically movable together with the male steering shaft 6 within the escape hole 54.

In the state before fitting the vehicle body fitting bracket 2 to the vehicle body, it might happen that the inner column 3 is released from the telescopic clamping and the tilt clamping by the outer column 4 when operating the operation lever 21 by mistake. In the case such as this, when the male steering shaft 6 is to escape from the female steering shaft 5, the come-out preventive member 7 abuts on the end portion of the female spline 51 on the rear side with respect to the vehicle body, i.e., the shoulder portion 55 on the opposite side to the insertion side of the male spline 61. The shoulder portion 55 is the vertical face on which the end portion of the female spline 51 on the rear side with respect to the vehicle body is formed vertically to the center axis of the female steering shaft 5, and hence the second winding 72 of the come-out preventive member 7 does not reduce in diameter after abutting on the shoulder portion 55. Therefore, the male steering shaft 6 cannot move any further in such a direction as to escape from the female steering shaft 5. As a result, it is feasible to surely prevent the male steering shaft 6 from escaping out of the female steering shaft 5. Namely, the inner column 3 can be certainly prevented from escaping out of the outer column 4.

Moreover, in this state, the male spline 61 of the portion closer to the front side with respect to the vehicle body than the outer peripheral annular groove 62 is fitted in the female spline 51. Thus, the phase of the male spline 61 and the phase of the female spline 51 are retained.

Note that the shoulder portion 55 is formed beyond the movement range of the come-out preventive member 7 with respect to the female spline shaft 5, which corresponds to the adjustment range of the telescopic position of the steering wheel 103. That is, in the adjustment range of the normal telescopic position after being mounted on the vehicle body, it does not happen that the come-out preventive member 7 abuts on the shoulder portion 55. Other constructions and effects are the same as those in the first embodiment. Note that the effect is the same if the come-out preventive member 8 is used as a substitute for the come-out preventive member 7 in the second embodiment.

Each of the embodiments given above has discussed the example in which the male steering shaft 6 is spline fitted in the female steering shaft 5, however, the present invention is not limited to the spline shaft, and a non-circular shaft such as a serration shaft capable of transferring the rotary torque may be sufficient. Moreover, each of the embodiments has discussed the example applied to steering apparatus in which the female steering shaft 5 is rotatably supported on the outer column 4, and the male steering shaft 6 is rotatably supported on the inner column 3, however, the present invention may also be applied to a steering apparatus in which the female steering shaft 5 is rotatably supported on the inner column 3, and the male steering shaft 6 is rotatably supported on the outer column 4.

Still further, each of the embodiments has discussed the example of applying the present invention to the tilt/telescopic type steering apparatus capable of adjusting both of the tilt position and the telescopic position, however, the present invention may also be applied to a telescopic type steering apparatus capable of adjusting only the telescopic position.

Yet further, when the come-out preventive member 7 or the come-out preventive member 8 slides on the female spline 51, i.e., when making the telescopic movement, plating may be applied to the come-out preventive member 7 or the come-out preventive member 8 in order to prevent the abnormal sound due to the slide between the come-out preventive member 7 or the come-out preventive member 8 and the female spline 51. The plating exhibits an effect in reducing a coefficient of friction and enables the steel to be worked at a low cost. Moreover, the come-out preventive member 7 and the come-out preventive member 8 may be coated with a low friction material or grease. All of these contrivances have the effect in reducing the coefficient of friction of the come-out preventive member 7 and the come-out preventive member 8, and can prevent, similarly to the case of applying the plating, the abnormal sound due to the slide between the come-out preventive member 7 or the come-out preventive member 8 and the female spline 51.

What is claimed is:

1. A steering apparatus comprising:
an inner column;
an outer column fitter to the inner column so as to be relatively movable in an axial direction;
a clamp mechanism fixing a relative position of the outer column to the inner column;
a female steering shaft rotatably support on one of the inner and outer columns, and having an inner peripheral surface formed with a female spline; and
a male steering shaft rotatably supported on the other of the inner and outer columns, the male steering shaft having its outer peripheral surface provided with a male spline inserted and fitted in the female spline, and being capable of moving in the axial direction with respect to the female steering shaft and transferring torque thereto, the steering apparatus being capable of adjusting a telescopic position of a steering wheel fitted to the female steering shaft or the male steering shaft,
wherein the female steering shaft and the male steering shaft are provided with a come-out preventive mechanism for preventing an axial escape of the male steering shaft from the female steering shaft in a state where a fitting portion between the female spline and the male spline remains,
the come-out preventive mechanism including:
an outer peripheral side annular groove formed in the male spline in a peripheral direction;
a resiliently deformable ring-shaped member fitted in the outer peripheral side annular groove; and
a diameter enlarged portion provided at one portion of the female spline in the axial direction or provided adjacently to an end portion of the female spline on the side opposite to the male spline insertion side,
the diameter enlarged portion is formed to have a diameter larger than a tooth tip circle of the female spline and have a widthwise dimension larger than a widthwise dimension of the ring-shaped member and is provided in a position where the fitting portion between the female spline and the male spline remains in such a state that a relative position of the female steering shaft to the male steering shaft becomes a position in which the diameter enlarged portion and the outer peripheral side annular groove are superposed in a radial direction, and the ring-shaped member gets resiliently deformed to be reduced in diameter upon abutting on the female spline when the male spline is inserted into the female spline, and enables the male spline to move with respect to the female spline in the axial direction, and the ring-shaped member resiliently returns to enlarge in diameter from a diameter reduced state when the female steering shaft and the male steering shaft make the relative axial movements in a direction of escape in a state after fitting the female spline and the male spline together but before mounting the steering apparatus on the vehicle body, and abuts on the female spline, thereby preventing the axial escape of the male steering shaft from the female steering shaft.

2. The steering apparatus according to claim 1, wherein an end portion of the female spline on the male spline insertion side is provided with a chamfer portion; and a large diameter portion having a diameter larger than a tooth bottom circle of the female spline is formed at a portion of the inner peripheral surface of the female steering shaft on the side opposite to the male spline insertion side, the outer peripheral side annular groove of the male spline has its bottom surface formed closer to an inner diametrical side than the tooth bottom circle of the male spline, the ring-shaped member is provided with a chamfer portion on an outer diametrical side, has its outer diameter of which a dimension is formed smaller than a diameter of a tooth tip face of the male spline but larger than a diameter of the tooth bottom circle of the male spline and an outer peripheral surface of the ring-shaped member is positioned within a range of a radial thickness of the chamfer portion provided at the female spline of the female steering shaft of which the outer peripheral surface is disposed coaxially with the male steering shaft as viewed from the axial direction of the male steering shaft, the ring-shaped member, when the male spline is inserted into the female spline, because of the chamfer portion on the outer diametrical side sliding on the chamfer portion of the female spline, gets resiliently deformed to reduce in diameter and gets movable in the axial direction within the outer peripheral side annular groove, and a gap exists between the outer peripheral surface of the ring-shaped member and the inner peripheral surface of the large diameter portion when the ring-shaped member is positioned at the large diameter portion of the female steering shaft.

3. The steering apparatus according to claim 1, an abutment portion of the female spline, on which the ring-shaped member abuts at the diameter enlarged portion when the female steering shaft and the male steering shaft make the relative movements in the escaping direction, is formed on the face vertical to the center axis of the female steering shaft.

4. The steering apparatus according to claim 3, wherein the diameter enlarged portion is formed in a position deviating on such a side that a telescopic adjustment position gets elongated from the movement range of the ring-shaped member with respect to the female steering shaft, which corresponds to the adjustment range of the telescopic position of the steering wheel in a state where the steering apparatus has been assembled to the vehicle body.

5. The steering apparatus according to claim 4, wherein if the diameter enlarged portion is provided at one portion of the female spline in the axial direction, a portion of the female spline, on the side opposite to the male spline insertion side from the diameter enlarged portion has an end portion formed with an inclined portion on the male spline insertion side, and the inclined portion is inclined in such a direction that the portion on the side opposite to the male spline insertion side approaches the center axis of the female steering shaft.

6. The steering apparatus according to claim 1, wherein the ring-shaped member has a ring-shaped diameter large portion abutting on the female spline and a resiliently deformable portion which gets resiliently deformed when the large diameter portion abuts on the female spline.

7. The steering apparatus according to claim 6, wherein the ring-shaped member is disposed in the outer peripheral side annular groove so that the large diameter portion is positioned to the side opposite to the male spline insertion side.

8. The steering apparatus according to claim 7, wherein the resiliently deformable portion is formed in a cone helical shape.

9. The steering apparatus according to claim 7, wherein the resiliently deformable portion includes a plurality of protrusions formed at the large diameter portion.

10. The steering apparatus according to claim 2, wherein an abutment portion of the female spline, on which the ring-shaped member abuts at the diameter enlarged portion when the female steering shaft and the male steering shaft make the relative movements it the escaping direction, is formed on the face vertical to the center axis of the female steering shaft.

11. The steering apparatus according to claim 10, wherein the diameter enlarged portion is formed in a position deviating on such a side that a telescopic adjustment position gets elongated from the movement range of the ring-shaped member with respect to the female steering shaft, which corresponds to the adjustment range of the telescopic position of the steering wheel in a state where the steering apparatus has been assembled to the vehicle body.

12. The steering apparatus according to claim 11, wherein if the diameter enlarged portion is provided at one portion of the female spline in the axial direction, a portion of the female spline on the side opposite to the male spline insertion side from the diameter enlarged portion has an end portion formed with an inclined portion on the male spline insertion side, and the inclined portion is inclined in such a direction that the portion on the side opposite to the male spline insertion side approaches the center axis of the female steering shaft.

13. The steering apparatus according to claim 2, wherein the ring-shaped member has a ring-shaped diameter large portion abutting on the female spline and a resiliently deformable portion which gets resiliently deformed when the large diameter portion abuts on the female spline.

14. The steering apparatus according to claim 13, wherein the ring-shaped member is disposed in the outer peripheral side annular groove so that the large diameter portion is positioned to the side opposite to the male spline insertion side.

15. The steering apparatus according to claim 14, wherein the resiliently deformable portion is formed in a cone helical shape.

16. The steering apparatus according to claim 14, wherein the resiliently deformable portion includes a plurality of protrusions formed at the large diameter portion.

* * * * *